(12) United States Patent
Rotzoll et al.

(10) Patent No.: US 8,581,441 B2
(45) Date of Patent: Nov. 12, 2013

(54) DISTRIBUTED INVERTER AND INTELLIGENT GATEWAY

(75) Inventors: Robert R. Rotzoll, Cascade, CO (US); Rajan N. Kapur, Boulder, CO (US); Suhas S. Patil, Cupertino, CA (US)

(73) Assignee: Enphase Energy, Inc., Petaluma, CA (US)

( * ) Notice: Subject to any disclaimer, the term of this patent is extended or adjusted under 35 U.S.C. 154(b) by 0 days.

(21) Appl. No.: 13/619,259

(22) Filed: Sep. 14, 2012

(65) Prior Publication Data
US 2013/0015710 A1    Jan. 17, 2013

Related U.S. Application Data

(63) Continuation of application No. 12/121,616, filed on May 15, 2008.

(60) Provisional application No. 60/938,663, filed on May 17, 2007.

(51) Int. Cl.
*H02J 1/00*    (2006.01)
*H02J 3/00*    (2006.01)

(52) U.S. Cl.
USPC .................................. 307/82; 307/1

(58) Field of Classification Search
USPC .................................. 307/1, 5, 6, 82
See application file for complete search history.

(56) References Cited

U.S. PATENT DOCUMENTS

| | | | |
|---|---|---|---|
| 5,227,762 A | 7/1993 | Guidette et al. | |
| 5,592,074 A | 1/1997 | Takehara | |
| 5,689,230 A | 11/1997 | Merwin et al. | |
| 5,886,890 A | 3/1999 | Ishida et al. | |
| 5,951,785 A | 9/1999 | Uchihashi et al. | |
| 6,111,767 A | 8/2000 | Handleman | |
| 6,278,245 B1 | 8/2001 | Li et al. | |
| 6,362,540 B1 | 3/2002 | Hill | |
| 6,384,580 B1 | 5/2002 | Ochoa et al. | |
| 6,465,993 B1 | 10/2002 | Clarkin et al. | |
| 6,587,051 B2 | 7/2003 | Takehara et al. | |
| 7,521,914 B2 | 4/2009 | Dickerson et al. | |
| 8,473,250 B2 | 6/2013 | Adest et al. | |

(Continued)

FOREIGN PATENT DOCUMENTS

| AU | 2003/0281409 A1 | 1/2004 |
|---|---|---|
| DE | 4032569 | 4/1992 |

(Continued)

OTHER PUBLICATIONS

Examination Report mailed Jul. 17, 2012 for Australia Patent Application 2011203367, 5 pages.

(Continued)

*Primary Examiner* — Carlos Amaya
(74) *Attorney, Agent, or Firm* — Moser Taboada

(57) ABSTRACT

A system and apparatus for generating power. In one embodiment, the apparatus comprises a power module for coupling to a DC power source via a DC bus, wherein the power module (i) converts a first power from the DC power source to a second power, and (ii) comprises a maximum power point tracking module unit for dynamically adjusting a load voltage of the DC power source; an AC bus; and a controller, physically separate from the power module and coupled to the power module via the AC bus, for operatively controlling the power module.

16 Claims, 9 Drawing Sheets

(56) References Cited

U.S. PATENT DOCUMENTS

| | | |
|---|---|---|
| 2003/0080741 A1 | 5/2003 | LeRow et al. |
| 2003/0111103 A1 | 6/2003 | Bower et al. |
| 2004/0024494 A1 | 2/2004 | Bayoumi et al. |
| 2005/0116671 A1 | 6/2005 | Minami et al. |
| 2005/0172995 A1 | 8/2005 | Rohrig et al. |
| 2006/0146504 A1 | 7/2006 | Belson et al. |
| 2007/0252716 A1 | 11/2007 | Burger |
| 2008/0097655 A1 | 4/2008 | Hadar et al. |
| 2008/0150366 A1* | 6/2008 | Adest et al. ............ 307/77 |
| 2008/0238195 A1 | 10/2008 | Shaver et al. |
| 2012/0248863 A1 | 10/2012 | Adest et al. |

FOREIGN PATENT DOCUMENTS

| | | |
|---|---|---|
| DE | 198 59 732 A1 | 6/2000 |
| EP | 0 793 278 A2 | 9/1997 |
| JP | 09135571 A | 5/1997 |
| JP | 10201105 | 7/1998 |
| JP | 11-122947 | 4/1999 |
| JP | 11-289773 | 10/1999 |
| JP | 2000092718 | 3/2000 |
| JP | 2002-526018 | 8/2002 |
| JP | 2002-289883 | 10/2002 |
| JP | 2003-116223 | 4/2003 |
| JP | 2005-041479 | 2/2005 |
| JP | 2005-312210 | 11/2005 |
| JP | 2006320149 | 11/2006 |
| JP | 2007-166818 | 6/2007 |
| JP | 2008-500797 | 1/2008 |
| JP | 2008-544735 | 12/2008 |
| WO | WO 03/098703 A2 | 11/2003 |
| WO | WO 2004/006342 A1 | 1/2004 |
| WO | WO 2005/117136 A2 | 12/2005 |
| WO | WO 2005/117136 A3 | 12/2005 |
| WO | WO 2005/117245 A1 | 12/2005 |
| WO | WO 2006/078685 | 7/2006 |

OTHER PUBLICATIONS

Examination Report mailed Jun. 6, 2012 for Canada Patent Application 2686272, 5 pages.

Roman et al, "Intelligent PV Module for Grid Connected PV Systems" IEEE Transactions on Industrial Electronics, vol. 53(4) Aug. 2006 p. 1066-1073.

International Search Report for PCT/US/2008/063958, Mailing Date Jan. 19, 2009, pp. 13.

International Search Report for PCT/US2008/063965, Mailing Date Dec. 23, 2008, pp. 30.

Non-Final Office Action dated Aug. 3, 2009, for U.S. Appl. No. 12/121,616, for patent application entitled "Distributed Inverter and Intelligent Gateway".

Final Office Action dated Mar. 1, 2010, for U.S. Appl. No. 12/121,616, for patent application entitled "Distributed Inverter and Intelligent Gateway".

Non-Final Office Action dated Jan. 3, 2012, for U.S. Appl. No. 12/121,616, for patent application entitled "Distributed Inverter and Intelligent Gateway".

Final Office Action dated Apr. 24, 2012, for U.S. Appl. No. 12/121,616, for patent application entitled "Distributed Inverter and Intelligent Gateway".

Search Report and Written Opinion mailed Oct. 2, 2008 for PCT Application No. PCT/US2008/063937.

Preliminary Report on Patentability dated Nov. 26, 2009 for PCT Application No. PCT/US2008/063958.

Availability of the Publication of International Application dated Nov. 27, 2008 for PCT Application No. PCT/2008/063965.

* cited by examiner

DISTRIBUTED INVERTER AND INTELLIGENT GATEWAY

CROSS-REFERENCE TO RELATED APPLICATIONS

This application is a continuation of co-pending U.S. patent application Ser. No. 12/121,616, entitled "Distributed Inverter and Intelligent Gateway" and filed May 15, 2008, which further claims the benefit of U.S. provisional patent application Ser. No. 60/938,663 filed May 17, 2007, both of which are herein incorporated by reference in their entirety. The present application is further related to co-pending U.S. patent application Ser. No. 12/121,578 entitled, "Photovoltaic AC Inverter Mount and Interconnect" and filed May 15, 2008, and U.S. patent application Ser. No. 12/121,580 entitled "Photovoltaic Module-Mounted AC Inverter" and filed May 15, 2008, both of which are hereby incorporated by this reference in their entirety.

BACKGROUND OF THE INVENTION

1. Field of the Invention

The invention relates to power conversion including direct current (DC) to alternating current (AC) and, more particularly, to photovoltaic module output power conversion to AC.

2. Description of the Related Art

In coming years, distributed generation of electricity is likely to become a larger and larger part of the energy sourced to utility grids. Distributed sources of electrical energy such as solar photovoltaic modules, batteries, fuel cells and others generate direct current (DC) power, which must be converted to alternating current (AC) power for transmission and usage in residential and commercial settings.

Also, as distributed generation increases, the utility grid, commonly known as the "grid," will be transformed to a still to be defined smart-grid that will support increased coordination between multiple generators and multiple loads. "Grid tied" photovoltaic systems are the most common form of solar electric systems today and they use a form of coordination called net-metering.

The larger number of photovoltaic installations are residential having an average capacity of about 2-3 kW. The bulk of new generating capacity is being installed in commercial buildings and utility scale installations. Residential systems commonly utilize single phase AC, while commercial systems most often use three phase AC.

Residential rooftops present a special challenge for the placement and interconnection of photovoltaic modules, due to the presence of gables, multiple roof angles, and other such obstructions. Such rooftops often do not expose a sufficiently large, commonly directed surface to the sun for photovoltaic modules to be positioned to harvest maximum power. Currently, conventional inverter-based interconnections are optimized to minimize IR (current times resistance) loss. This is referred to as string design. The inverters perform a function called maximum power point tracking (MPPT) on strings of PV modules. The MPPT process evaluates the PV module string output current-voltage curve on a continuous or sampled basis to determine the correct load voltage thus maximizing the string output power calculated as the string output voltage times current. Due to the nature of residential rooftops, the string design results in MPPT performance at the levels of the least power producing modules in the photovoltaic (PV) array. This degrades the AC power harvest from the entire array.

The use of microinverters in a one-to-one configuration with the PV modules removes the string design challenge, thereby enabling each PV module to produce current at its full capacity and truly permits MPPT at a per PV module level. The one-to-one arrangement of microinverters and PV modules is also referred to as AC PV modules in related art.

Commercial buildings and larger installations present slightly different challenges. In commercial buildings, large, commonly directed surfaces are generally available, but even then, obstructions, such as HVAC components must be dealt with as the components may block solar radiation. String design and MPPT also continue to be of concern. Additionally, since such installations often consist of thousands of PV modules, monitoring, operation and maintenance can be time consuming and expensive.

The use of AC PV modules for commercial installations simplifies string design, improves AC power harvest and provides the ability to remotely monitor the entire PV array on a module by module basis. A multiphase microinverter has the additional advantage of delivering substantially balanced multiphase AC power.

The benefits of microinverters have been documented in related art dating back almost three decades. Yet, the use of microinverters continues to be negligible due to their inferior reliability and efficiency as well as their high cost as compared to conventional inverters.

Typically, PV modules are placed in hostile outdoor environments in order to gain maximum exposure to solar radiation. Microinverters must be placed in proximity to the PV modules to realize their full benefits. Conventional inverters are typically placed in more benign environments, often indoors, e.g., on a protected wall or in a utility closet.

When microinverters are placed in proximity to PV modules, the hostile outdoor environment exacerbates the design challenge for achieving high reliability, high efficiency and low cost. Similarly, servicing and replacing microinverters on a rooftop is potentially more challenging and labor intensive than servicing and replacing centralized inverters.

The related art design approach for microinverters has been to implement them as miniaturized versions of conventional inverters, incorporating all the functions and components that were used in conventional inverters. Early versions of related art for microinverters utilized electrolytic capacitors, having a lifespan susceptible to degradation at high temperatures. Other versions of related art microinverters eliminate the electrolytic capacitor, thereby improving the lifespan.

FIG. 1 shows a simplified diagram of a related art grid tied photovoltaic system utilizing a conventional inverter. Referring to FIG. 1, PV modules 102 are mounted outdoors 110 for direct access to solar radiation and connected to a conventional inverter 105 using DC wiring 104. Both inverter 105 and DC wiring 104 are located in a weather protected region 111 such as the interior of a structure. The inverter 105 output feeds local AC loads 106 through AC wiring 103. The inverter's output is also tied for bi-directional flow of energy for net-metering to the utility grid 101 through exterior AC wiring 107.

FIG. 2 shows a simplified diagram of a related art grid tied photovoltaic system including microinverters. Referring to FIG. 2, PV modules 202 are mounted outdoors 210 for direct access to solar radiation. Microinverters 203 are electrically coupled in one-to-one proximity to the PV modules 202 (typically under them) and convert individual PV module DC outputs to AC power which is then fed to AC wiring 204. The AC wiring 204 feeds local loads 206 and the utility grid 201.

A problem with the related art microinverters is that they either collocate all inverter functions including safety and code compliance within the microinverter or they do not address how these functions are to be implemented, thereby making the design for high reliability and long life difficult and expensive. The collocation may also require redevelopment and replacement of the microinverter when code compliance requirements change.

SUMMARY OF THE INVENTION

Accordingly, the invention is directed to a distributed inverter and intelligent gateway that substantially obviates one or more of the problems due to limitations and disadvantages of the related art.

An advantage of the invention is to provide a system and method of installation, operation, and maintenance of a power conversion system that is simple and safe.

Another advantage of the invention is to provide a high degree of reliability and a long lifetime to the microinverter.

Yet another advantage of the invention is to provide upgradeability of the system during the lifetime of the system.

Additional features and advantages of the invention will be set forth in the description which follows, and in part will be apparent from the description, or may be learned by practice of the invention. The features of the invention will be realized and attained by the structure particularly pointed out in the written description and claims hereof as well as the appended drawings.

To achieve these and other advantages and in accordance with the purpose of the invention, an embodiment of the invention is directed towards a system for transforming energy. The system for transforming energy includes a plurality of photovoltaic modules. The plurality of microinverters is electrically coupled to the photovoltaic modules in a one-to-one relationship. The system also includes a gateway electrically coupled to the plurality of microinverters and features of the gateway are capable of being upgraded with at least one of hardware, software, and firmware.

In another aspect of the invention, an embodiment of the invention includes a gateway for use in a system for use in an energy generating system. The gateway includes an interface unit for interfacing with a plurality of microinverters and a utility grid. The gateway also includes a control unit electrically coupled to the interface unit for controlling at least one of safety functionality, synchronization functionality to synchronize the plurality of microinverters to the utility grid, and monitoring functionality to monitor the plurality of microinverters and the utility grid. The control unit is capable of being electrically coupled to an external monitor. In yet another aspect of the invention, an embodiment of the invention includes a photovoltaic system for transforming radiant energy into alternating current. The photovoltaic system includes a plurality of photovoltaic modules and a plurality of microinverters coupled to the photovoltaic modules in a one-to-one relationship. Each of the plurality of microinverters includes an inversion unit, a MPPT unit, a communications unit, a safety unit, an interface unit and a control unit. The inversion unit converts DC into AC and the MPPT unit optimizes power from the plurality photovoltaic modules. The communications unit provides communications to the gateway. The safety unit provides safety functions. In addition, a gateway is coupled to the plurality of microinverters. The gateway includes an interface unit and a control unit. The interface unit interfaces with a plurality of microinverters and a utility grid. The control unit is coupled to the interface unit for controlling at least one of safety functionality, synchronization to synchronize the plurality of microinverters to the utility grid and monitoring where the control unit is capable of being coupled to an external monitor.

It is to be understood that both the foregoing general description and the following detailed description are exemplary and explanatory and are intended to provide further explanation of the invention as claimed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

In the drawings.

DETAILED DESCRIPTION

Embodiments of the invention include a novel approach whereby only those functions and components that are necessary to achieve the advantages of microinverters are placed in assemblies in proximity to the PV modules and other functions including, for example, system control, are located elsewhere. This separation of functions and components is termed partitioning. The control and coordination of the system is performed without additional wiring. Communications may occur via powerline, wired and/or wireless channels. Disabling the communications channel provides a way for turning the microinverters off thereby facilitating inverter or PV module replacement, maintenance or other desired tasks. Moreover, the partitioning provides for enhanced safety as compared to the related art. In the related art, in the presence of solar radiation, the PV module outputs are always enabled and are thus capable of electrocuting the installer. Accordingly, embodiments of the invention provide for safer and simpler installation and maintenance procedures.

In addition, the partitioning reduces the number and type of components placed in the PV module proximate assemblies that are subject to the hostile outdoors environment, such as temperature. Fewer components and simplified assembly also result in improved reliability and increased system lifetime. Cost is reduced by eliminating common system functions from the microinverter. In embodiments of the invention where these functions are realized with cheaper or less robust components located in a less hostile environment, the cost may also be further reduced.

In some embodiments, the partitioning may include physically locating programmable functions in an area distinct from the PV module assemblies, such as, in a gateway. Accordingly, the features located in the gateway are decoupled or partitioned from the PV module assemblies. The functions and components in the gateway may be upgraded over the lifetime of the system. Therefore, the development cycle of the gateway is decoupled from the development cycle of the microinverter assemblies coupled to the PV module assemblies, and thus several generations of gateways having different value added functions can be developed for use with the same microinverter assemblies. This leads to an upgradeable system at a significantly reduced cost as compared to the related art.

Reference will now be made in detail to embodiments of the invention, examples of which are illustrated in the accompanying drawings.

Figure 1:
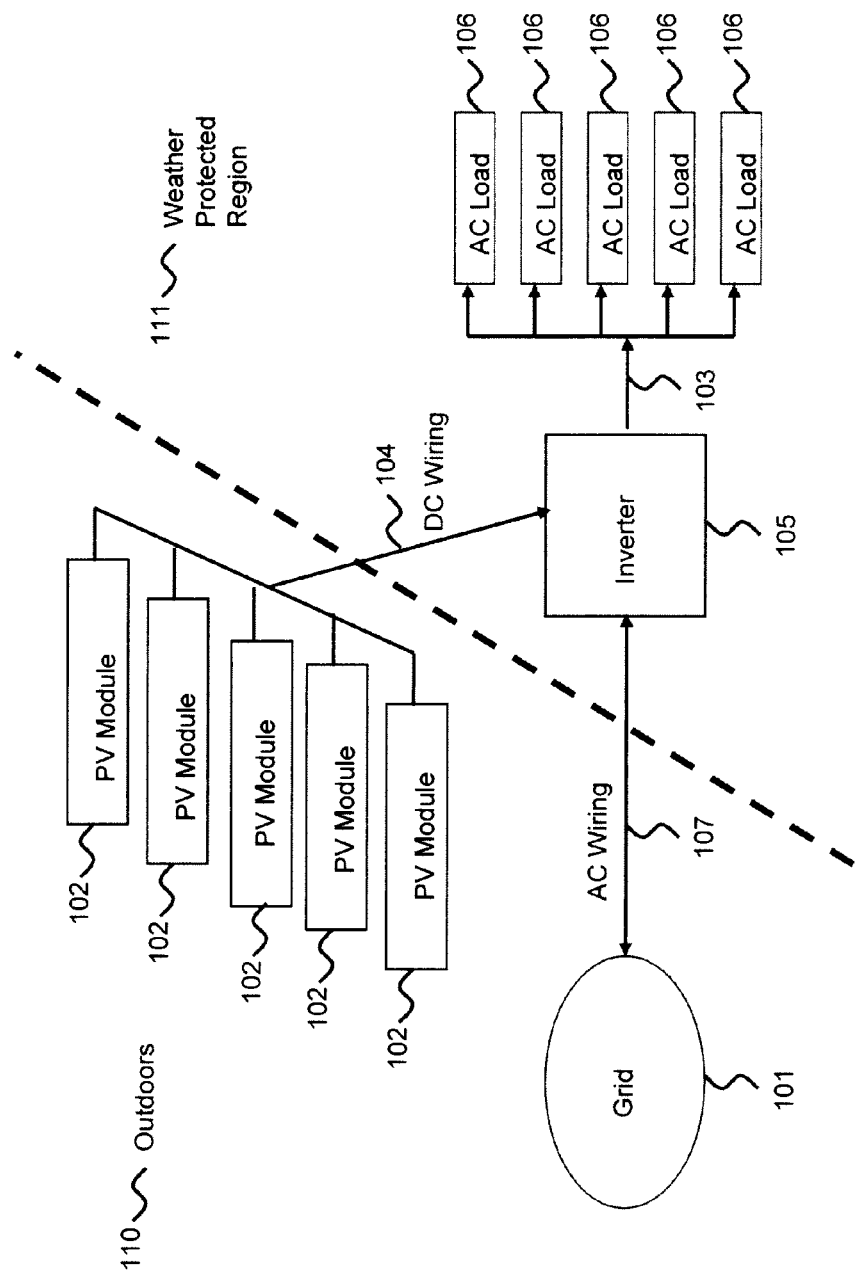
FIG. 1 is a diagram of a related art grid tied photovoltaic system using a conventional centralized inverter.
Figure 2:
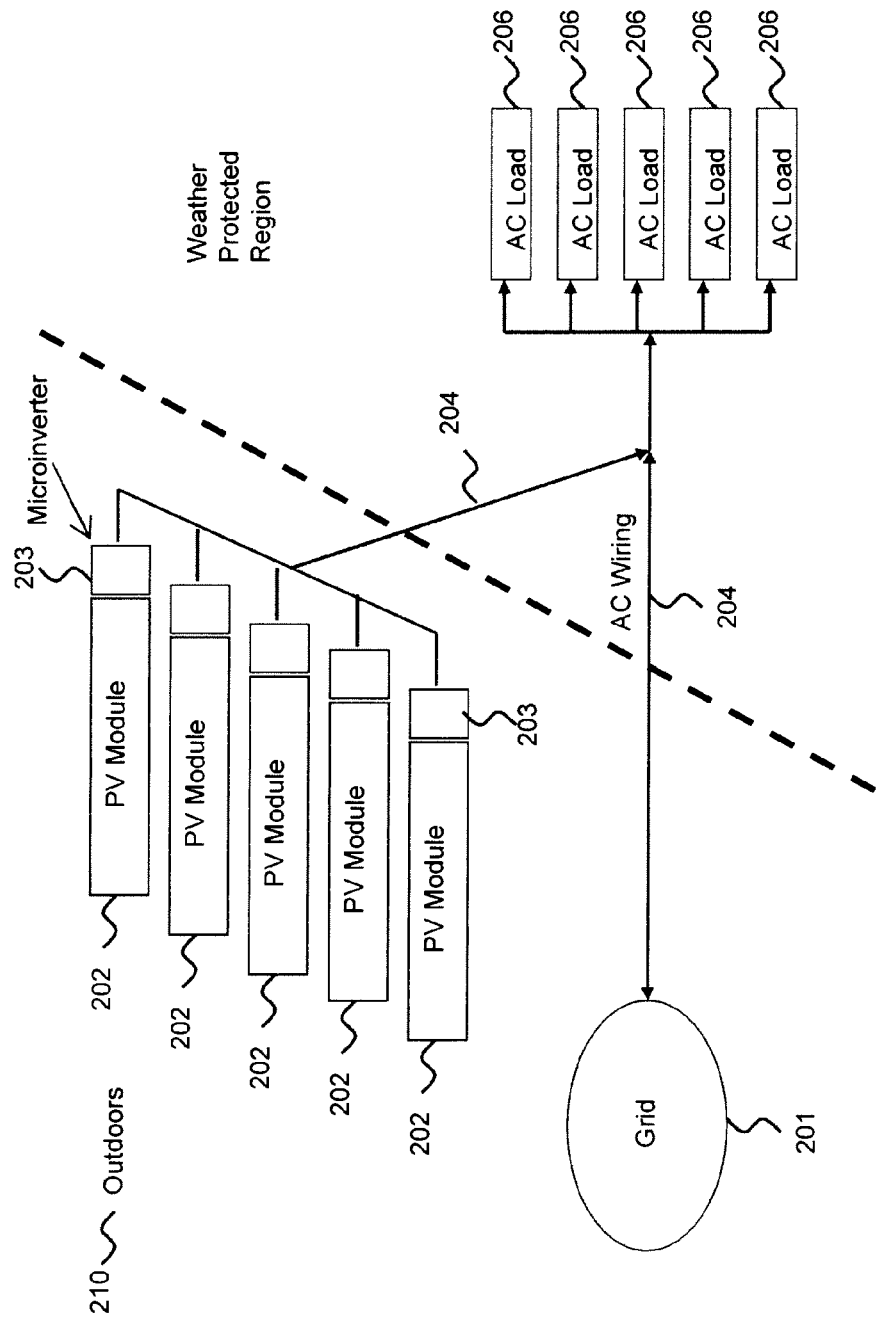
FIG. 2 is a diagram of a related art grid tied photovoltaic system using conventional microinverters.
Figure 3:
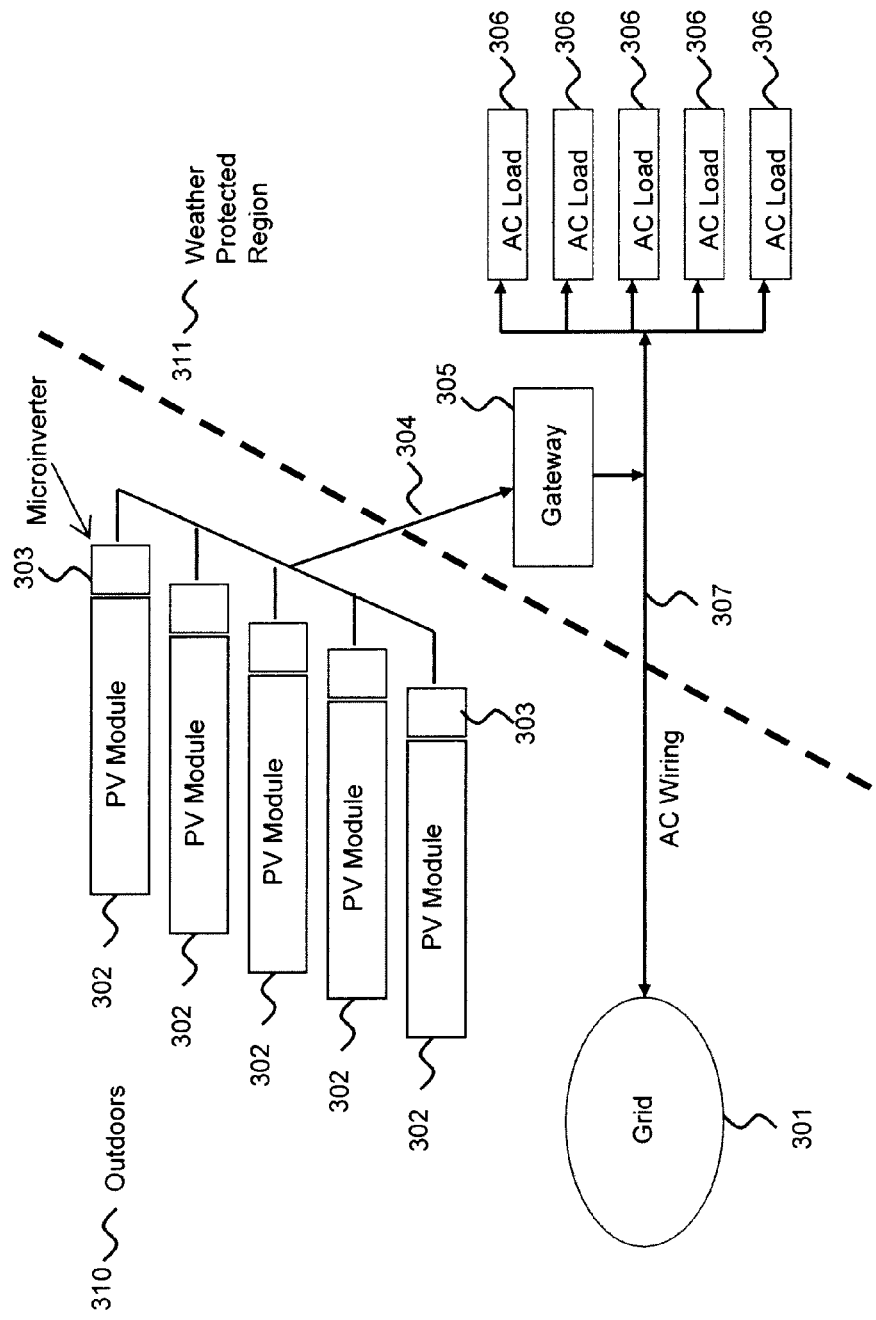
FIG. 3 is a diagram of a grid tied photovoltaic system using distributed converters including microinverters and a gateway according to an embodiment of the invention.

FIG. 3 is a diagram of a grid tied photovoltaic system using distributed converters including microinverters and a gateway according to an embodiment of the invention. The grid tied photovoltaic system includes a plurality of PV modules 302 mounted outdoors 310 each coupled electrically and mechanically to microinverter assemblies 303. In this embodiment, the gateway 305 is located in a weather protected environment 311, e.g., indoors, for accessibility and protection from the elements. However, the gateway 305 could be located in an outdoor environment or other location. The gateway 305 receives AC current from the plurality of microinverters 303 via a first AC wiring 304. The gateway 305 is connected to the grid 301 and to local loads 306 via a second AC wiring 307. The loads 306 are thereby always connected to the grid 301. The gateway 305 provides a point of measurement of the AC performance of the PV system and also the electrical behavior of the grid 301. The gateway 305 also provides control and monitoring of the microinverters 303.

Figure 4:
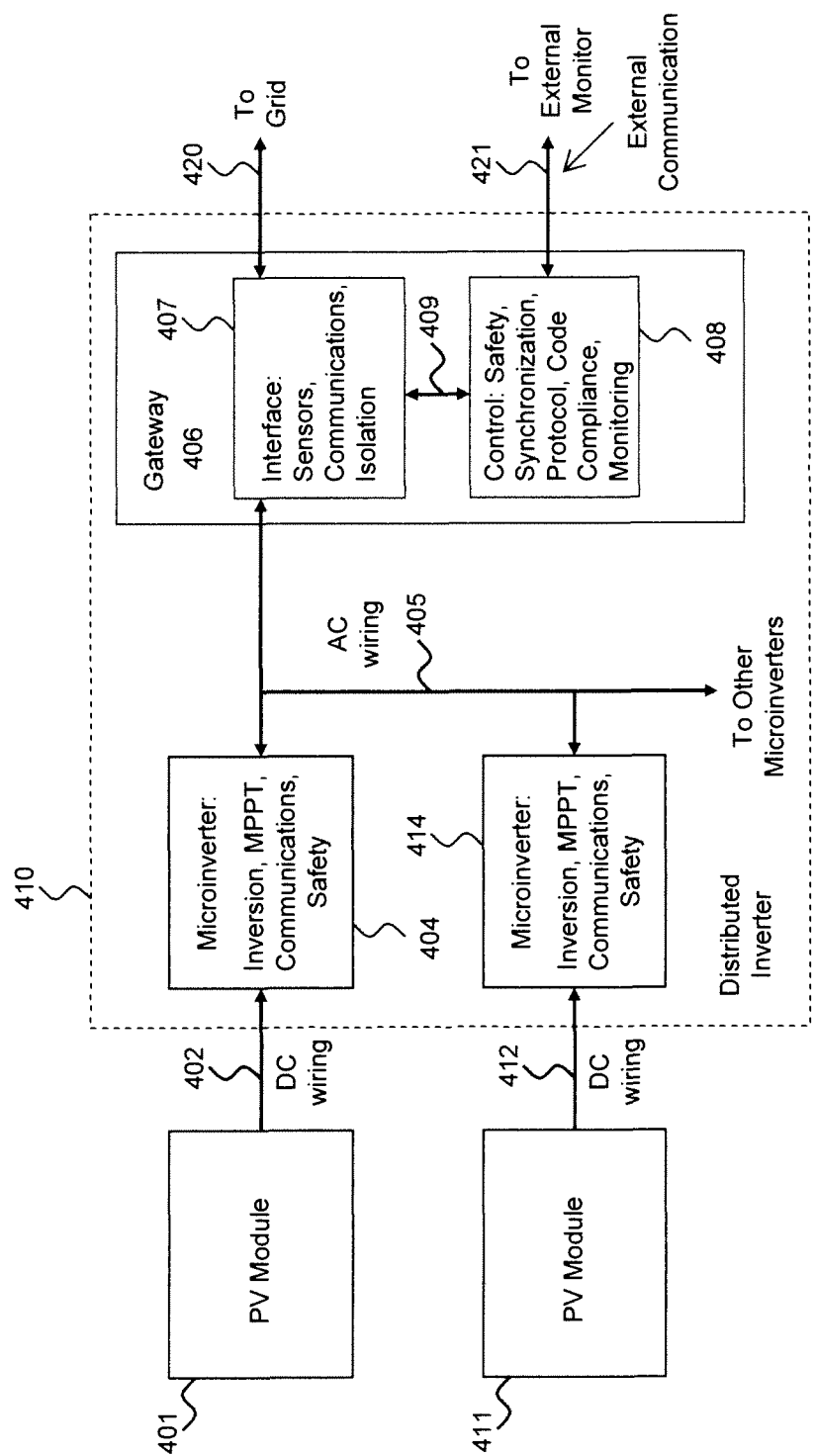
FIG. 4 is a block diagram of a distributed converter utilizing microinverters according to another embodiment of the invention.

FIG. 4 is a block diagram of a distributed converter according to another embodiment of the invention. Referring to FIG. 4, a system for transforming energy includes a first photovoltaic module 401 and a second photovoltaic module 411 coupled to a distributed inverter 410 with DC wiring 402, 412. The distributed inverter 410 is functionally partitioned into a gateway 406 and a first microinverter 404 and a second microinverter 414. The first PV module 401 connects to the first microinverter 404 via first DC wiring 402 and the second PV module 411 connects to the second microinverter 414 via second DC wiring 412. Additional PV modules can be connected via independent DC wires to associated additional microinverters.

The AC output of all microinverters is connected in parallel via AC wiring 405 to the gateway 406. The gateway 406 includes an interface unit 407 and a control unit 408. The interface unit 407 is connected to the control unit 408 via interface wiring 409. The interface unit connects to the utility grid via AC power wiring 420. The control unit connects to an external monitor via data communications wiring 421 or via a wireless data communications channel.

The first and second microinverters 404, 414 include a power inversion unit, a maximum power point tracking (MPPT) unit, a communications unit and a safety unit. The power inversion unit converts DC power from the associated PV module to AC power. The AC power may be generated in single-phase or multi-phase form. The MPPT unit detects the output power of the associated PV module and adjusts the load voltage presented to the PV module in such a way as to maximize the power available from the PV module. The MPPT unit and functionality are described by Hussein K. H., Mutta I., Hoshino T. and Osakada M., in "Maximum photovoltaic power tracking: An algorithm for rapidly changing atmospheric conditions", IEE Proceedings, Generation, Transmission and Distribution, Vol. 142, No. 1, January 1995, which is hereby incorporated by reference as if fully set forth herein. The communications unit provides bi-directional data communications between the microinverter 404, 414 and the gateway 406. Data communications from the gateway 406 to the microinverter 404, 414 includes, for example, power conversion control, status requests, fail-safe shutdown operation and other relevant data operations. Data communications from the microinverter 404, 414 to the gateway 406 includes PV module DC output voltage and current data, microinverter AC output voltage and current data, microinverter operational status and other relevant data.

The safety unit establishes conditions to enable or disable current flow from the PV module 401, 411 to the microinverter 404, 414 and from the microinverter 404, 414 to the gateway 406. One safety function of the safety unit is to establish that the utility grid voltage available at the AC wiring 405 is within specifications to allow the inverter to safely drive the grid. If the appropriate grid voltage specifications are met, then the safety unit enables both input and output current through the microinverter 404, 414. This first function is also performed by the gateway 406 and the function is secondary within the microinverter 404, 414 as a backup fail-safe system in case of failure of the primary safety function of gateway 406.

Another safety function of the safety unit is to test for a communications signal from the gateway 406 indicating that the grid is safe to drive with AC output current. If the gateway were disabled by any means, the communications signal emitted by the gateway 406 would be disabled. The safety unit detects this condition and immediately disables all current flow into and out of the microinverter 404, 414. The communications signal from the gateway 406 is termed a "heartbeat" and provides a primary fail-safe mechanism for disabling PV system AC and DC power flow in the event of a grid failure, fire or other safety hazard.

Yet another safety function of the safety unit is to support removal and reattachment of the microinverter 404, 414 while the entire PV system is enabled. This is termed a hot-swap and requires that the microinverter 404, 414 shut down upon detection of the removal or reattachment of the microinverter to suppress any arcs or high voltages that may develop at the microinverter DC wiring 402, 412 or AC wiring 405 terminals. High voltages at the microinverter terminals are suppressed as a means to insure that maintenance personnel are not able to contact the exposed terminals while they are energized. The microinverter 404, 414 shuts down if either the AC output voltage at AC wiring 405 does not meet prescribed conditions, such as a disconnect or grid failure, or if the PV module DC input voltage at DC wiring 402, 412 appears to be disconnected.

The gateway 406 acts as master controller in the distributed inverter 410 by performing functions such as providing the above described heartbeat to the microinverters, monitoring their output, monitoring the grid and other related functions. The gateway 406 can turn off the heartbeat when, for example, the gateway detects a fault or unsafe conditions in the environment, maintenance is to be performed, an AC power failure occurs and/or other related operating conditions. Similarly, if the gateway 406 is physically absent, the heartbeat is thereby also absent, resulting in the disabling of the microinverters.

The communication between the gateway 406 and the microinverters 404, 414 may be performed over the AC wiring 405, wirelessly, or by other suitable means such as independent wiring. Both communication over AC wiring and wireless communication have the advantage that no additional wiring is required beyond that to support the transfer of AC power in the system. In the case of communication over the AC wiring 405 a wireline modulator/demodulator subfunction is included within both the gateway 406 and the microinverters 404, 414 to perform the communication functions utilizing the AC wiring 405.

In this embodiment, the gateway 406 functions are split into an interface unit 407 and a control unit 408. The interface unit 407 includes a sensor unit, a communications unit and an isolation unit. The sensor unit provides a way to dynamically monitor grid conditions, for example to dynamically measure grid AC voltage, current, frequency, phase and other related grid signal characteristics. In addition, the communications unit provides means to send and receive data to and from connected microinverters 404, 414. The isolation unit substantially prevents data communications between the microinverters 404, 414 and the gateway 406 from appearing at the grid wiring 420 or onto the grid. Similarly, noise and other signals, with the exception of the desired grid AC power voltage and current, are substantially prevented from appearing at the AC wiring 405 between the microinverters 404, 414 and the gateway 406.

The control unit 408 provides monitoring and control functions to monitor the microinverters 404, 414. Some of the control includes controlling at least safety functionality and synchronization functionality to synchronize the microinverters 404, 414 to the grid and monitoring functionality to monitor the microinverters 404, 414 and the utility grid. In addition, the control unit 408 provides grid synchronization, communications protocols, grid connection performance compliance and system monitoring. The control unit can be implemented with a computer or microcontroller.

In this embodiment, software and firmware run on the control unit 408 to implement functions such as generating the heartbeat, monitoring the microinverters, monitoring the grid and monitoring any AC loads. Using the previously described communications system the control unit 408 can address each microinverter 404, 414 individually, in subsets, or as an entire ensemble.

For example in one embodiment, the control unit 408 provides synchronization signals for matching the frequency and phase of the microinverter 404, 414 AC output to the grid AC power. The heartbeat fail-safe is also implemented in the control unit 408. Other functions may include monitoring the health and productivity of each microinverter and each PV module.

The control unit 408 also performs grid related protocols such as detection of grid failure, anti-islanding detection, adjustment of parameters utilized in the anti-islanding detection and related functions. New grid related protocols will be defined to implement a future smart-grid in which the grid operator may enable, disable or modify the control system of a grid-connected PV system. The control unit 408 is constructed with flexible hardware, software and firmware to adapt to future grid-defined control and communications protocols, without requiring changes to the microinverters 404, 414.

The gateway 406 as a whole can also be upgraded to support future system requirements by changing the hardware, software or firmware while utilizing the same microinverters 404, 414. For the grid connection 420 of the gateway 406, the control unit 408 can perform load management functions, as directed through the grid protocol or other external sources. Related art monitoring and display functions can also be implemented in the control unit 408.

The wiring 409 carries all data between the interface unit 407 and the control unit 408. External communications to the gateway 406 from an external monitor occurs via communications wiring 421, or other communications means such as wireless communications. This is used to externally monitor and control operation of the gateway 406 and allows for system remote control via internet connection or other remote communications means.

By reducing the functions performed within the microinverter 404, 414 a reduction in the required microinverter complexity is achieved, thereby leading to simpler implementation of the microinverter and increased reliability, increased lifetime, and reduced cost as compared to the related art. In particular, the elimination from the microinverter of precision grid signal measurement requirements to support anti-islanding functionality for grid connection specification compliance as defined, for example, by IEEE standard IEEE-1547, eliminates considerable complexity, expense and lifetime limiting components from the microinverter.

IEEE standard IEEE-1547, and related standards used throughout the world, defined a narrow set of circumstances upon which the grid is driven by the inverter. If a break in the grid wiring occurs, an inverter could continue driving power into the un-connected branch of the grid. This region in which the primary grid generators no longer apply power is termed an island. The inverter is required by the IEEE-1547 standard to disable its output power under such conditions so as not to drive the island in the grid for both safety and technical reasons. This is known as anti-islanding. The gateway 406 assumes the primary role in detecting the defined islanding condition and communicates the associated inverter shutdown command to the microinverters 401, 411 to implement the anti-islanding function. Example grid conditions for an anti-islanding shutdown are a very high grid voltage, a low grid voltage, a high grid frequency, a low grid frequency or a significant variation in grid impedance. The grid is usually of low impedance, therefore the usual grid impedance variation is an increase when the island occurs.

The system of FIG. 4 can also be used to convert power for primary or secondary power sources other than PV modules 401, 411 such as wind turbines, fuel cells, batteries, and other power sources.

Figure 5:
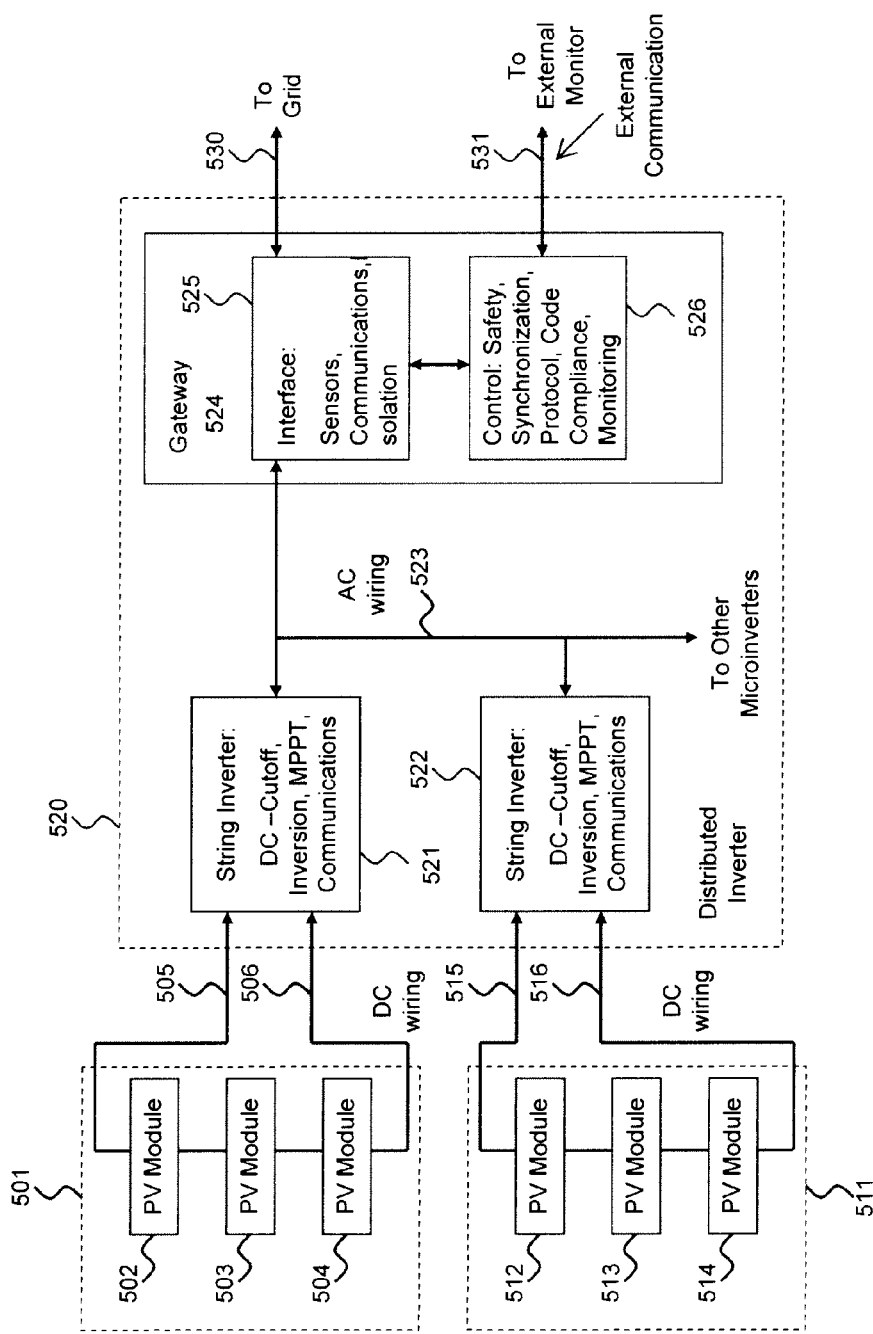
FIG. 5 is a block diagram of a distributed converter utilizing string inverters according to another embodiment of the invention.

FIG. 5 is a block diagram of a PV system according to another embodiment of the invention. A first PV module string 501 includes a first PV module 502, a second PV module 503 and a third PV module 504 that are connected in series. A first output DC wire 505 and a second DC output wire 506 from the PV module string 501 are connected to a first string inverter 521. A second PV module string 511 includes a fourth PV module 512, a fifth PV module 513 and a sixth PV module 514 that are connected in series. A third output DC wire 515 and a fourth DC output wire 516 from the PV module string 511 are connected to a second string inverter 522. The AC outputs of the first string inverter 521 and second string inverter 522 are connected in parallel via AC wiring 523 to the gateway 524. The PV module strings 501, 511 may include any number of PV modules that are series connected. Any number of PV module strings may be used in conjunction with associated string inverters in this system.

PV module strings 501, 511 are not required to include equal numbers of PV modules 502, 503, 504, 512, 513, 514 as is the case in related art. This provides the benefit of a simple string design in which the string DC output voltages are not required to be matched between strings 501, 511. Moreover, MPPT may be performed on a per string basis, so one string does not degrade the performance of another, as is the case with related art where equal length strings are connected in parallel. This arrangement has the potential to provide greater AC power harvest than conventional inverters, but less AC power harvest than microinverters.

A distributed inverter 520 is functionally partitioned into a gateway 524 and string inverters 521, 522. The functions of the gateway 524 in this embodiment are the same as the functions of the gateway 406 as described herein. The gateway 524 includes an interface unit 525 and a control unit 526, both of which are the same as described with reference to FIG. 4 herein. Accordingly, the benefits of partitioning the gateway 524 from the multiple-string inverters 521, 522 in FIG. 5 are substantially similar to the benefits of partitioning the gateway 406 from the microinverters 404, 414 in FIG. 4. For example, the benefits include using a heartbeat for safety and independent upgradeability of the gateway from that of the string inverters. In this embodiment, the multiple-string inverters 521, 522 are placed close to the gateway and away from the hostile outdoors environment. The AC output of all string inverters 521, 522 are connected to the gateway in parallel via AC power wiring 523. The gateway 524 is connected to the grid via wiring 530. External communications to the gateway 524 from an external monitor occurs via communications wiring 531, or other communications means such as wireless communications. This is used to externally monitor and control operation of the gateway 524 and allows for system remote control via internet connection or other remote communications means.

Figure 6:
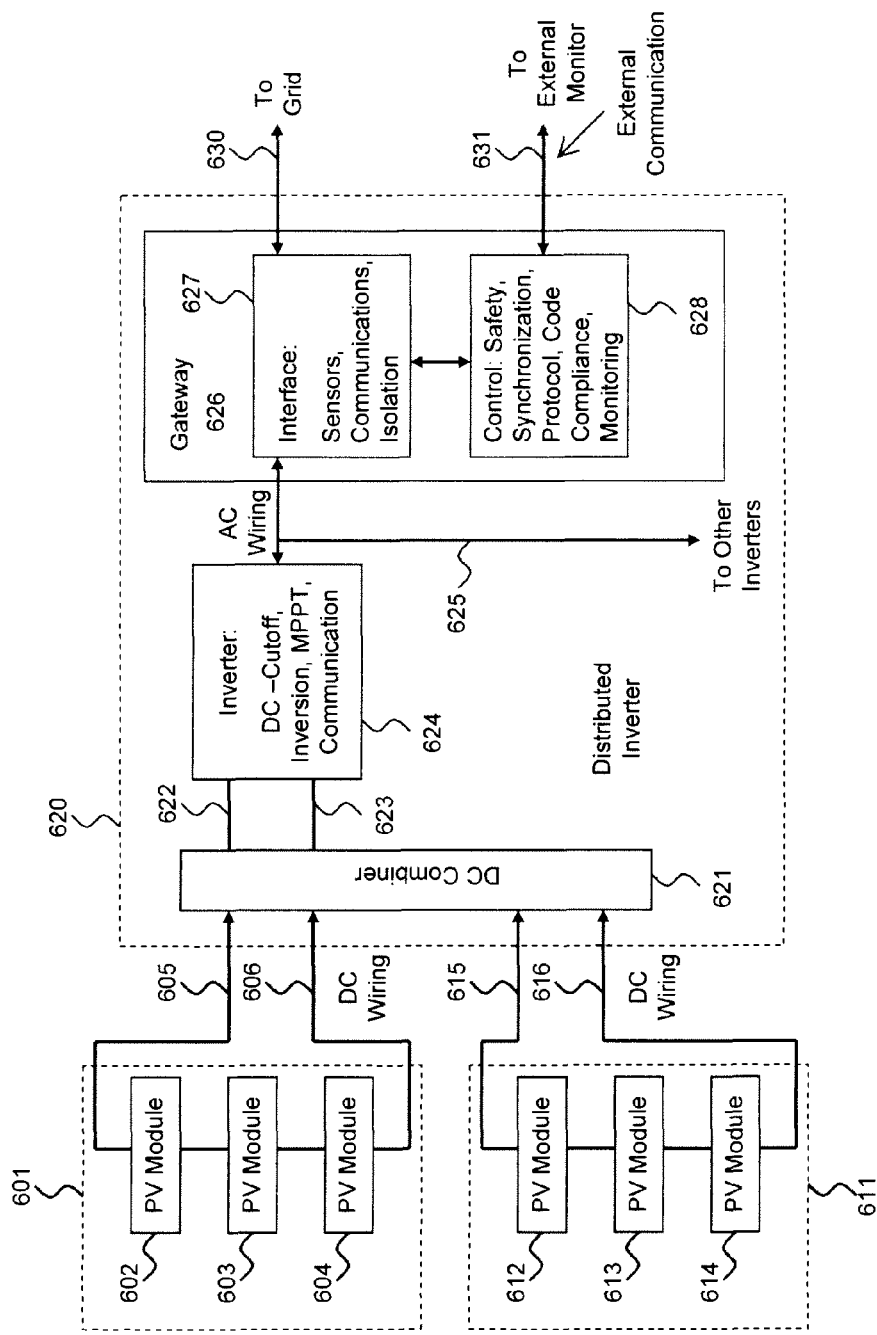
FIG. 6 is a block diagram of a distributed converter utilizing centralized inverters according to another embodiment of the invention.

FIG. 6 is a block diagram of a PV system according to another embodiment of the invention. A first PV module string 601 includes a first PV module 602, a second PV module 603 and a third PV module 604 that are connected in series. A first output DC wire 605 and a second DC output wire 606 from the PV module string 601 are connected to the DC combiner 621. A second PV module string 611 includes a fourth PV module 612, a fifth PV module 613 and a sixth PV module 614 that are connected in series. A third output DC wire 615 and a fourth DC output wire 616 from the PV module string 611 are connected to the DC combiner 621.

A first DC output 622 and a second DC output 623 from the DC combiner connects to the DC inputs of an inverter 624. The AC outputs of the inverter 624 are connected in parallel to other inverters via AC wiring 625 to the gateway 626. The PV module strings 601, 611 can include any number of PV modules that are connected in series. Any number of PV module strings can be used in conjunction with associated DC combiners. A plurality of inverters 624 may be used with outputs connected in parallel in the system.

In this embodiment, the PV module strings 601, 611 must be of equal length when connected to a common DC combiner 621. This scheme is consistent with connection of conventional inverters as known to one of ordinary skill in the art. The AC output of the inverter 624 is connected to the gateway 626 in parallel via AC power wiring 625.

In addition, the inverter 624 is similar to conventional inverters as known to one of ordinary skill in the art except that control functions are implemented in a gateway 626 rather than within the inverters. The functions of the gateway 626 in this embodiment are substantially similar to its functions in the embodiment shown in FIG. 4. The gateway 626 includes an interface unit 627 and a control unit 628, both of which are the same as discussed with reference to FIG. 4 herein. Accordingly, the development cycles of the inverters and controllers can be decoupled with improved system performance and the ability to upgrade without changing the inverters. The gateway 626 is connected to the grid via wiring 630. External communications to the gateway 626 from an external monitor occurs via communications wiring 631, or other communications means such as wireless communications. This is used to externally monitor and control operation of the gateway 626 and allows for system remote control via internet connection or other remote communications means.

Figure 7:
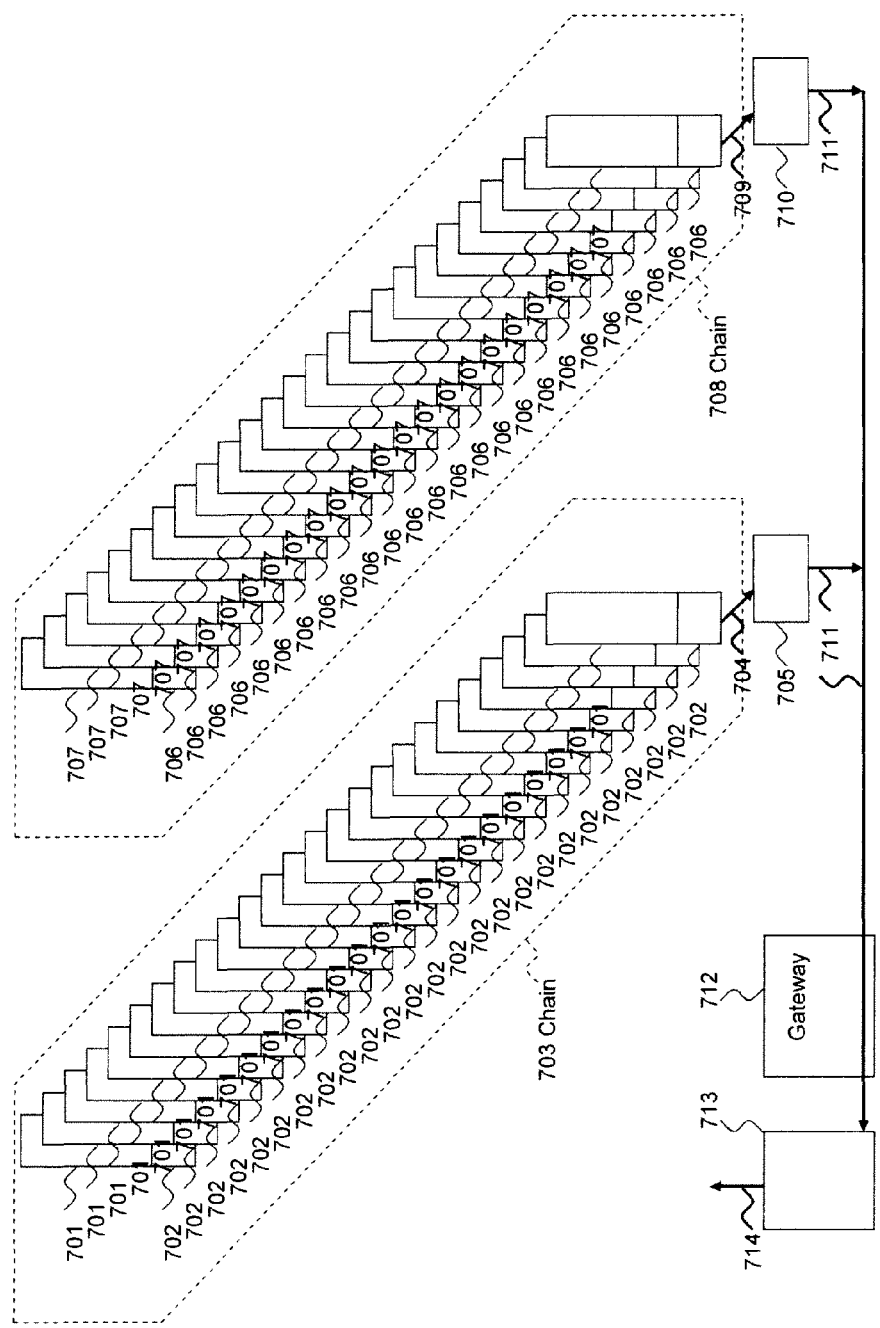
FIG. 7 is a block diagram of a PV system utilizing microinverters according to another embodiment of the invention.

FIG. 7 is a block diagram showing a PV system according to another embodiment of the invention. Referring to FIG. 7, a distributed inverter includes a gateway 712 based on the concepts embodied in FIG. 4. The gateway 712 includes an interface unit and a control unit, both of which are the same as discussed with reference to FIG. 4 herein.

PV modules 701 are individually coupled to microinverters 702 on a first chain 703, and PV modules 707 are individually coupled to microinverters 706 on a second chain 708. The outputs of the microinverters 702 are connected in parallel to each other and, through AC wire 704, to an AC circuit breaker 705, and on to AC wiring 711. The outputs of the microinverters 706 are connected in parallel to each other and, through AC wire 709, to an AC circuit breaker 710 and on to AC wiring 711.

The AC wiring 711 is connected to the gateway 712, AC cutoff 713, and to the grid through AC wiring 714. Note that components and wiring 704, wiring 711, wiring 710, AC cutoff 713 and wiring 714 are conventional AC electrical components and their selection and installation is consistent with the understanding of one of ordinary skill in the art.

FIG. 7 illustrates the scalability of installation using distributed inverters. The concept of hierarchical or replicated gateways suggests itself for much larger capacity systems, as does the concept of additional chains to the same gateway 712. Without loss of generality, the output of the microinverters can be single-phase AC, split-phase AC or multi-phase AC.

Figure 8:
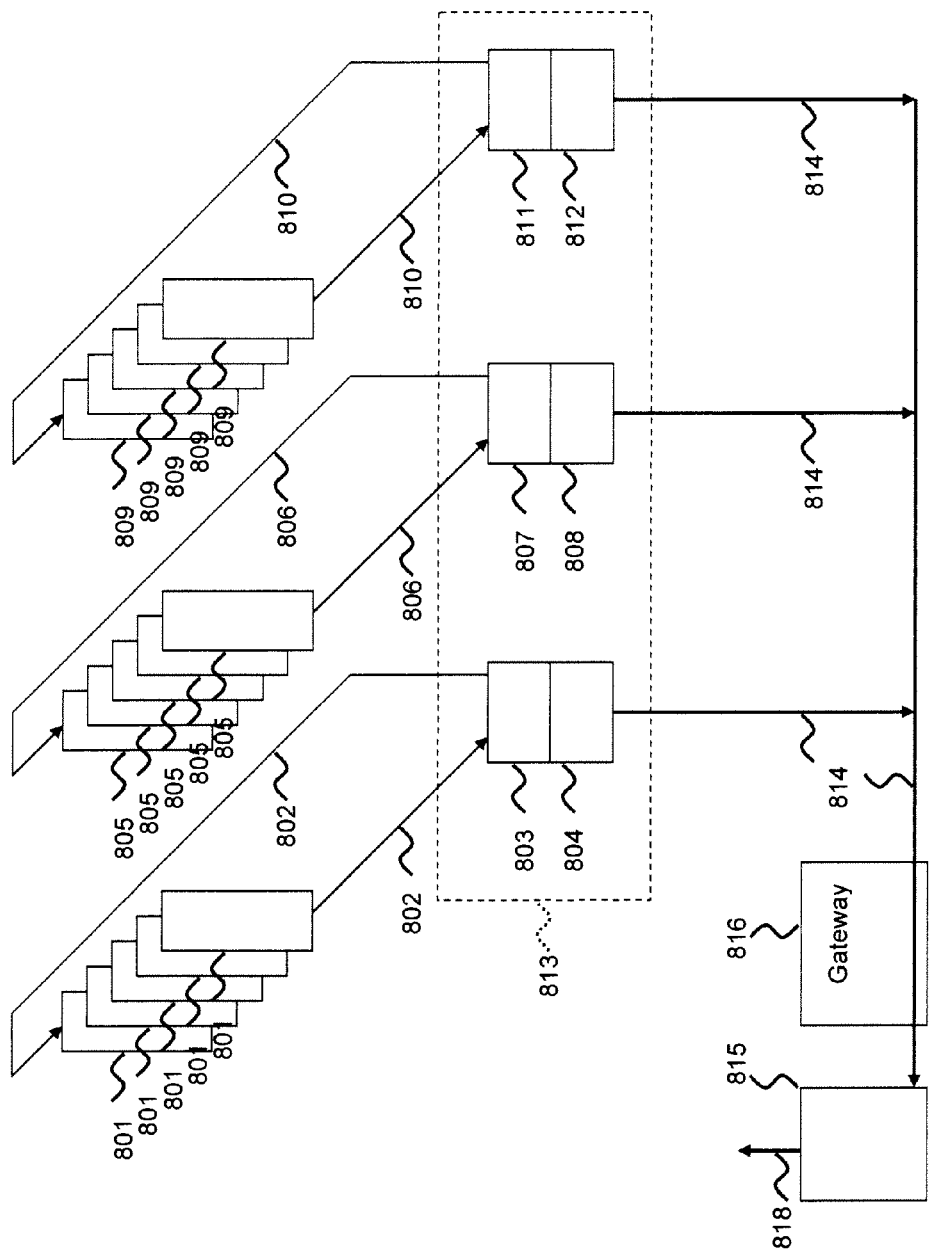
FIG. 8 is a block diagram of a PV system utilizing multiple string inverters according to another embodiment of the invention.

FIG. 8 is a block diagram showing a PV system according to another embodiment of the invention. Referring to FIG. 8, a distributed inverter includes a gateway 816 and a multiple-string inverter, based on the concepts embodied in FIG. 5. The gateway 816 is the same as the gateway as described in FIG. 5. Accordingly, the upgradeability, safety features, and enhanced performance benefits may also be similar. A plurality of PV modules 801 are connected in a first series string and coupled to first string inverter 803 via DC wiring 802. A plurality of PV modules 805 are connected in a second series string and coupled to second string inverter 807 via DC wiring 806. A plurality of PV modules 809 are connected in a third series string and coupled to third string inverter 811 via DC wiring 810.

The AC output of the first string inverter 803 is coupled through an AC circuit breaker 804 into AC wiring 814. The AC output of the second string inverter 807 is coupled through an AC circuit breaker 808 into AC wiring 814. The AC output of the third string inverter 811 is coupled through an AC circuit breaker 812 into AC wiring 814.

The AC wiring 814 is connected to the gateway 816, AC cutoff 815, and to the grid through AC wiring 818. Optionally, the inverters 803, 807, 811 and the AC circuit breakers 804, 808, 812 may be placed in a common enclosure 813 to simplify installation and protect the inverters and circuit breakers from environmental effects. The system may be expanded by increasing the number of PV modules in a string, strings, string inverters and AC circuit breakers.

Figure 9:
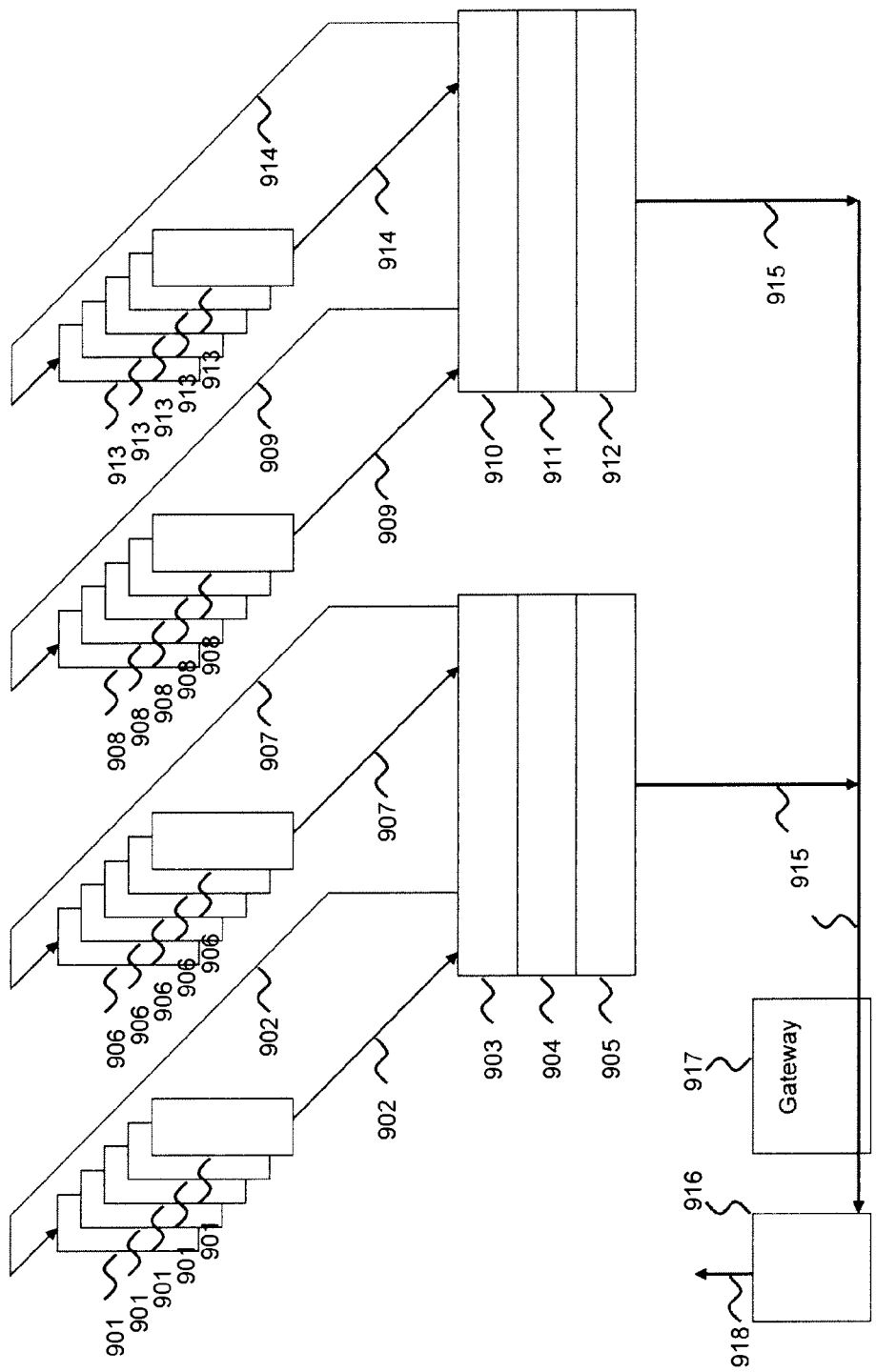
FIG. 9 is a block diagram of a PV system utilizing centralized inverters according to another embodiment of the invention.

FIG. 9 is a block diagram showing a PV system according to another embodiment of the invention. Referring to FIG. 9, a distributed converter including a gateway 917 and a multiple inverter, based on the concepts embodied in FIG. 6. The gateway 917 is the same as the gateway as described in FIG. 6. Accordingly, the upgradeability, safety features, and enhanced performance benefits may also be similar. A plurality of PV modules 901 are connected in a first series string and coupled to a first DC combiner 903 via DC wiring 902. A plurality of PV modules 906 are connected in a second series string and coupled to a first DC combiner 903 via DC wiring 907. A plurality of PV modules 908 are connected in a third series string and coupled to a second DC combiner 910 via DC wiring 909. A plurality of PV modules 913 are connected in a fourth series string and coupled to a second DC combiner 910 via DC wiring 914.

The DC output of the first DC combiner 903 is connected to the DC input of a first inverter 904. The AC output of the first inverter 904 is coupled through an AC circuit breaker 905 into AC wiring 915. The DC output of the second DC combiner 910 is connected to the DC input of a second inverter 911. The AC output of the second inverter 911 is coupled through an AC circuit breaker 912 into AC wiring 915.

The AC wiring 915 is connected to the gateway 917, AC cutoff 916, and to the grid through AC wiring 918. Optionally, the inverters 904, 911, the DC combiners 903, 910, and the AC circuit breakers 905, 912 may be placed in a common enclosure (not shown) to simplify installation and to protect them from environmental effects.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

While the foregoing is directed to embodiments of the present invention, other and further embodiments of the invention may be devised without departing from the basic scope thereof, and the scope thereof is determined by the claims that follow.

The invention claimed is:

1. Apparatus for generating power, comprising:
a plurality of photovoltaic (PV) modules for generating DC power;
at least one inverter for receiving DC power from at least one PV module in the plurality of PV modules, wherein the at least one inverter comprises a first inverter and a second inverter and each inverter of the at least one inverter comprises (i) an inversion unit for converting the received DC power into AC power and coupling the AC power to AC wiring, wherein the AC wiring is single-phase AC wiring or split-phase AC wiring, and (ii) an inverter communications unit for bi-directionally communicating inverter monitoring data to the AC wiring; and
a gateway comprising a control unit for processing the inverter monitoring data communicated by the inverter communications unit via the AC wiring and an interface unit interfacing with the inverter communications unit of the at least one inverter using the AC wiring and communicating with an external monitor.

2. The apparatus of claim 1, wherein the communication to the external monitor utilizes wireless or wired communications channels.

3. The apparatus of claim 1, wherein the inverter monitoring data further includes at least one of inverter operational status, AC current and voltage output data of the inversion unit, or DC current and voltage output data of one or more corresponding PV modules.

4. The apparatus of claim 1, where each inverter of the at least one inverter further comprises a maximum power point tracking (MPPT) unit for optimizing corresponding PV module DC output power.

5. The apparatus of claim 1, where the at least one PV module comprises two or more PV modules that are series connected to form a string of PV modules.

6. The apparatus of claim 5, where each inverter of the at least one inverter further comprises a maximum power point tracking (MPPT) unit that performs optimization on a per string basis such that one string of PV modules does not degrade performance of another.

7. The apparatus of claim 1, wherein each PV module of the plurality of PV modules has a single corresponding inverter, and the first and the second inverters are connected in parallel via the AC wiring.

8. The apparatus of claim 1, wherein the gateway further performs at least one of safety, synchronization, protocol, or grid code compliance functions.

9. A system for partitioning power control functions of inverters, comprising:
a first plurality of photovoltaic (PV) modules for generating a first DC power and a second plurality of PV modules for generating a second DC power;
a first DC combiner, coupled to the first plurality of PV modules, for combining the first DC power from the first plurality of PV modules;
a second DC combiner, coupled to the second plurality of PV modules, for combining the second DC power from the second plurality of PV modules;
at least one inverter comprising a first inverter and a second inverter, the first inverter coupled to the first DC combiner for receiving the combined first DC power and the second inverter coupled to the second DC combiner for receiving the combined second DC power, wherein each inverter of the at least one inverter further comprises (i) an inversion unit for converting DC power from a corresponding DC combiner into AC power and coupling the AC power to AC wiring, wherein the AC wiring is single-phase AC wiring or split-phase AC wiring, and Ea an inverter communications unit for bi-directionally communicating inverter monitoring data through the AC wiring; and
a gateway comprising a control unit and an interface unit, where the control unit processes the inverter monitoring data received from the AC wiring and the interface unit bi-directionally communicates with the at least one inverter using the AC wiring and communicates with an external monitor.

10. The system of claim 9, wherein the communication to the external monitor utilizes wireless or wired communications channels.

11. The system of claim 9, wherein the inverter monitoring data further includes at least one of inverter operational status, AC current and voltage output data of the inversion unit, or DC current and voltage output data of corresponding PV modules.

12. The system of claim 9, where each inverter of the at least one inverter further comprises a maximum power point tracking (MPPT) unit for optimizing corresponding PV module DC output power.

13. The system of claim 9, where the first plurality of PV modules is series connected to form a first string of PV modules and the second plurality of PV modules is series connected to form a second string of PV modules.

14. The system of claim 13, where each inverter of the at least one inverter further comprises a maximum power point tracking (MPPT) unit that performs optimization on a per string basis such that one string of PV modules does not degrade performance of another.

15. The system of claim 9, wherein each of the first and the second plurality of PV modules has a single corresponding inverter, and the first and the second inverters are connected in parallel via the AC wiring.

16. The system of claim 13, wherein the gateway further performs at least one of safety, synchronization, protocol, or grid code compliance functions.

* * * * *